United States Patent [19]
Nassef

[11] Patent Number: 6,106,703
[45] Date of Patent: Aug. 22, 2000

[54] WASTE TREATMENT SYSTEM

[76] Inventor: Namon A. Nassef, 11562 Clear Creek Dr., Pensacola, Fla. 32514

[21] Appl. No.: 09/198,832

[22] Filed: Nov. 24, 1998

[51] Int. Cl.$^7$ .............................. B01D 17/12; E03D 9/10
[52] U.S. Cl. ........................... 210/85; 210/103; 210/104; 210/149; 210/173; 210/195.1; 210/258; 210/259; 4/320; 4/321
[58] Field of Search ................................ 210/85, 86, 104, 210/134, 137, 143, 149, 173, 103, 106, 198.1, 512.1; 194/179, 180, 495.1, 257.1, 258, 259; 4/319–322

[56] References Cited

U.S. PATENT DOCUMENTS

| | | | |
|---|---|---|---|
| 3,622,511 | 11/1971 | Pizzo et al. | 210/173 |
| 3,733,617 | 5/1973 | Bennett | 210/173 |
| 3,956,126 | 5/1976 | Streebin et al. | 210/104 |
| 4,324,007 | 4/1982 | Morris | 210/173 |
| 4,347,142 | 8/1982 | Albertassi et al. | 210/173 |
| 5,891,330 | 4/1999 | Morris | 210/179 |

*Primary Examiner*—Joseph W. Drodge
*Attorney, Agent, or Firm*—Peter Loffler

[57] ABSTRACT

A waste treatment system for use on a vehicle having an exhaust manifold, the waste treatment system comprising a holding tank for receiving waste from a head, a galley, a shower or a bilge tank. At least one macerator is connected to the holding tank such that the macerator grinds the waste from the holding tank and recirculates it, as appropriate. A reducer is connected to the at least one macerator for reducing the size of the output of the at least one macerator. A centrifugal separator separates the relatively large waste particles coming from the reducer from the relatively small waste particles and liquid waste and recirculates the relatively large particles back to the holding tank. The remaining particles are sent to an injector pump that injects the waste, through an injector nozzle, into the exhaust manifold of the vessel. A control module controls the operation of the system based on various parameters, the parameters derived from various sensors.

32 Claims, 4 Drawing Sheets

WASTE TREATMENT SYSTEM

BACKGROUND OF THE INVENTION

1. Field of the Invention

The present invention relates to a waste treatment system for use on a vehicle or other appropriate location, whereby the waste is incinerated.

2. Background of the Prior Art

There are several traditional methods of treating marine sanitary waste and bilge water. One such method is to disinfect the waste by using appropriate chemicals and once disinfected, to either hold the waste in a holding tank and thereafter remove the treated wasted to a sanitary sewer when the marine vessel is in port. Alternately, the treated waste can be discharged overboard while at sea. In either method, the waste may be macerated before treatment and discharge.

Such waste treatment systems are not without drawbacks. The need to hold chemicals as well as the treated waste requires relatively large holding tanks be on board the vessel. The space requirement for the holding tanks takes away from the usable space on board the vessel. The need to take on chemicals and to remove the waste places additional burdens on the vessel operator while in port and adds to the cost of operating the vessel.

Waste that is discharged into the sea introduces chemicals, solids or organics to the sea and thereby pollutes it. As a result, waste discharge overboard is banned by many nations within their territorial waters. Nevertheless, many vessels ignore the law and discharge the waste overboard. Some vessels even discharge the waste without treating it.

Therefore, there is a need for a waste treatment system that addresses the above-mentioned problems associated with present day treatment systems. Such a system must treat the waste without placing undue space burdens on board the vessel. Such a system must not require chemicals or other additives to be on board the vessel and must not place additional burdens on the vessel operators while in port. Such a waste treatment system must not substantially increase the operating costs of the vessel, and will ideally offer little incentive to the operators to bypass the system.

SUMMARY OF THE INVENTION

The waste treatment system of the present invention addresses the aforementioned needs in the art. The waste treatment system disposes with the need for adding chemicals to the waste and thereby eliminates the need to carry such chemicals and the resulting pollution generated from the chemicals. Furthermore, the waste treatment system requires that only a portion of the vessel-generated waste be stored at any given time, thereby reducing the size of the required holding tanks. The waste treatment system relies on an energy source from that vessel that must be generated irrespective of the waste treatment system, and does not otherwise impose undue burdens onto the vessel or its personnel. Therefore, there is little incentive for operators of the vessel to bypass the waste treatment system.

The waste treatment system of the present invention is used within a vehicle that has an engine with an exhaust manifold, the waste treatment system comprising a holding tank for receiving the waste, the waste coming from an input source including a head, a galley, a shower, or a bilge tank, via a conduit line. At least one macerator is fluid flow connected to the holding tank, while an injector nozzle is disposed within the exhaust manifold. An injector pump is disposed between the at least one macerator and the injector nozzle for pumping waste from the macerator to the injector nozzle. An overflow line, controlled by an overflow valve is fluid flow connected to the bilge tank and is controlled by a first multilevel sensor disposed within the holding tank and a second multilevel sensor disposed within the bilge tank. A reducer is disposed between the macerator and the injector pump, the reducer comprised of a housing having an inlet port and a discharge port, a motor, an impeller operatively connected to the motor, at least one cutter head, operatively connected to the motor, disposed within the housing, and at least one sizing plate, each having a plurality of openings, operatively connected to the motor and associated with a respective one of the at least one cutter head. The openings of the sizing plates becoming successively smaller in proceeding from the inlet port to the discharge port. A centrifugal separator, having a recirculation line back to the holding tank, is disposed between the reducer and the injector pump, while a fluid line, controlled by a control valve and connected to a fresh fluid source, is disposed between the centrifugal separator and the injector pump for introducing fresh liquid into the system for cleaning the system. The first multilevel sensor and the second multilevel sensor, along with other sensors, are used to control various components of the system.

Although the waste treatment system of the present invention is described in relation to a marine vessel, it is noted that the system will work equally well with a land based vehicle or with a fixed structure such as a building wherever a source of surplus heat is available.

BRIEF DESCRIPTION OF THE DRAWINGS

Similar reference numerals refer to similar parts throughout the several views of the drawings.

DESCRIPTION OF THE PREFERRED EMBODIMENT

Figure 1:
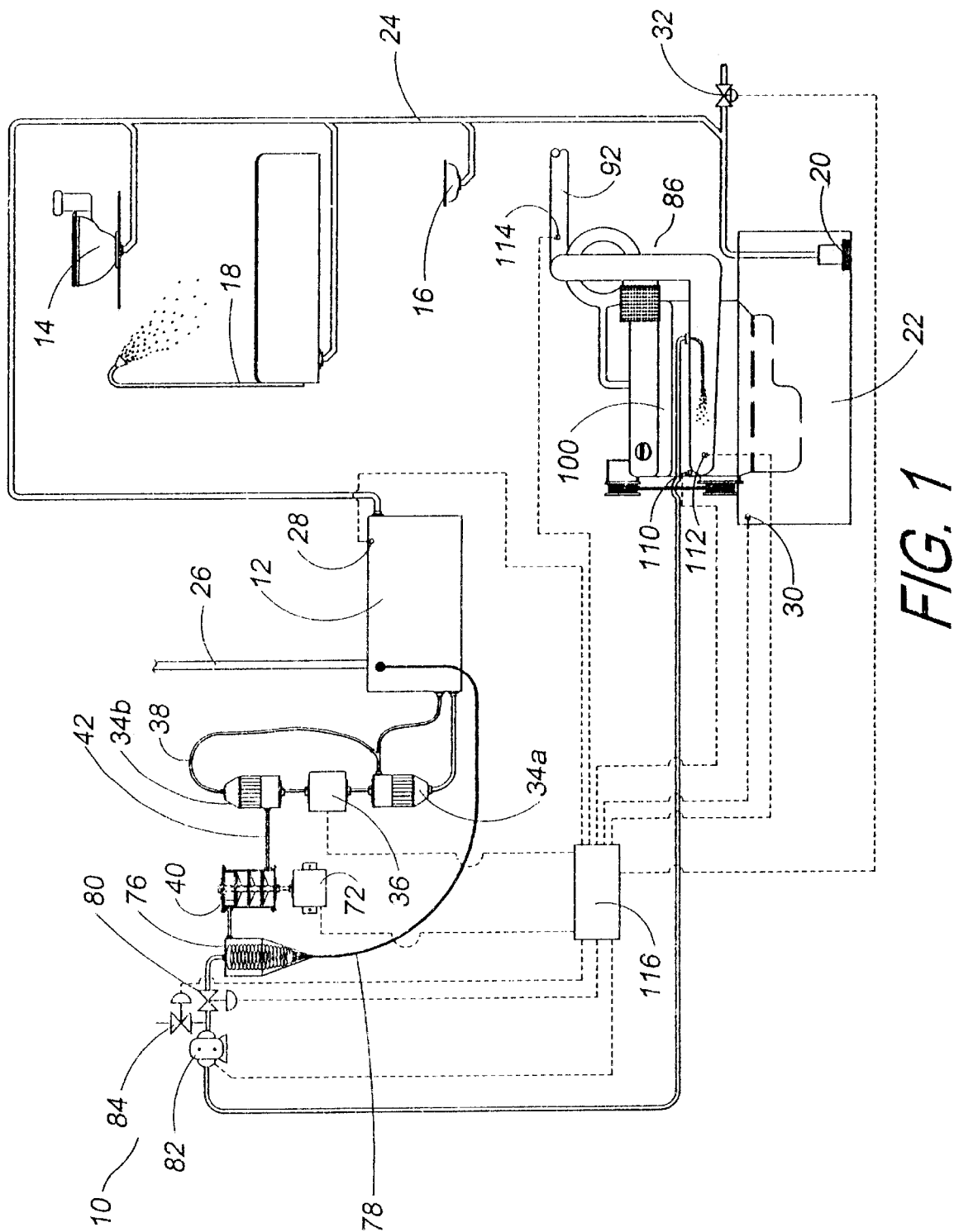
FIG. 1 is a process flow diagram, depicting in general for, the various components of the waste treatment system of the present invention.

Referring now to the drawings, it is seen that the waste treatment system of the present invention, generally denoted by reference numeral 10, is comprised of a holding tank 12. Waste is introduced into the holding tank 12 from various sources, including the head 14, the galley 16, the shower 18 and from the bilge pump 20 within the bilge tank 22, via appropriate waste conduits 24. An appropriate vent 26 is secured to the holding tank 12 while a first multilevel sensor 28 is disposed within the holding tank 12 while a second multilevel sensor 30 is disposed within the bilge tank 22. An overflow valve 32 is connected to the waste conduit 24 proximate the bilge tank 22.

At least one macerator 34a and possibly two or more macerators 34b are secured, in fluid flow communication, to the holding tank 12. If two macerators 34a and 34b are used, the first macerator 34a will be a coarse head macerator which macerates incoming waste to a relatively coarse size and the second macerator 34b will be a fine head macerator which macerates incoming waste to a relatively fine size. Of course waste will first be introduced into the first macerator 34a and thereafter to the second macerator 34b. Each macerator 34a and 34b is operatively connected to an appropriate motor 36. A recirculation line 38 is in fluid flow communication with each macerator 34a and 34b and the holding tank 12.

Figure 2:
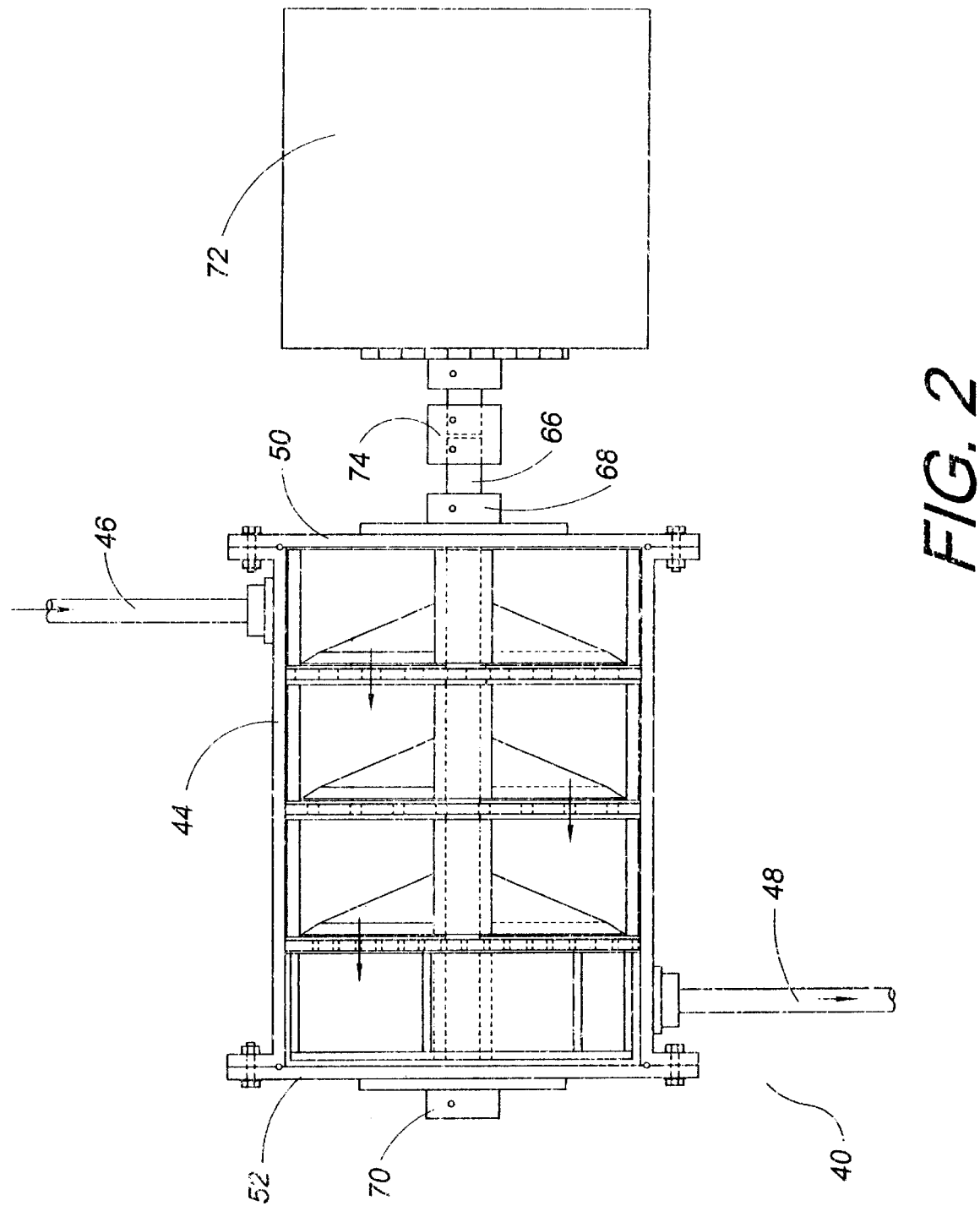
FIG. 2 is a sectioned view of the reducer used with the waste treatment system.
Figure 3:
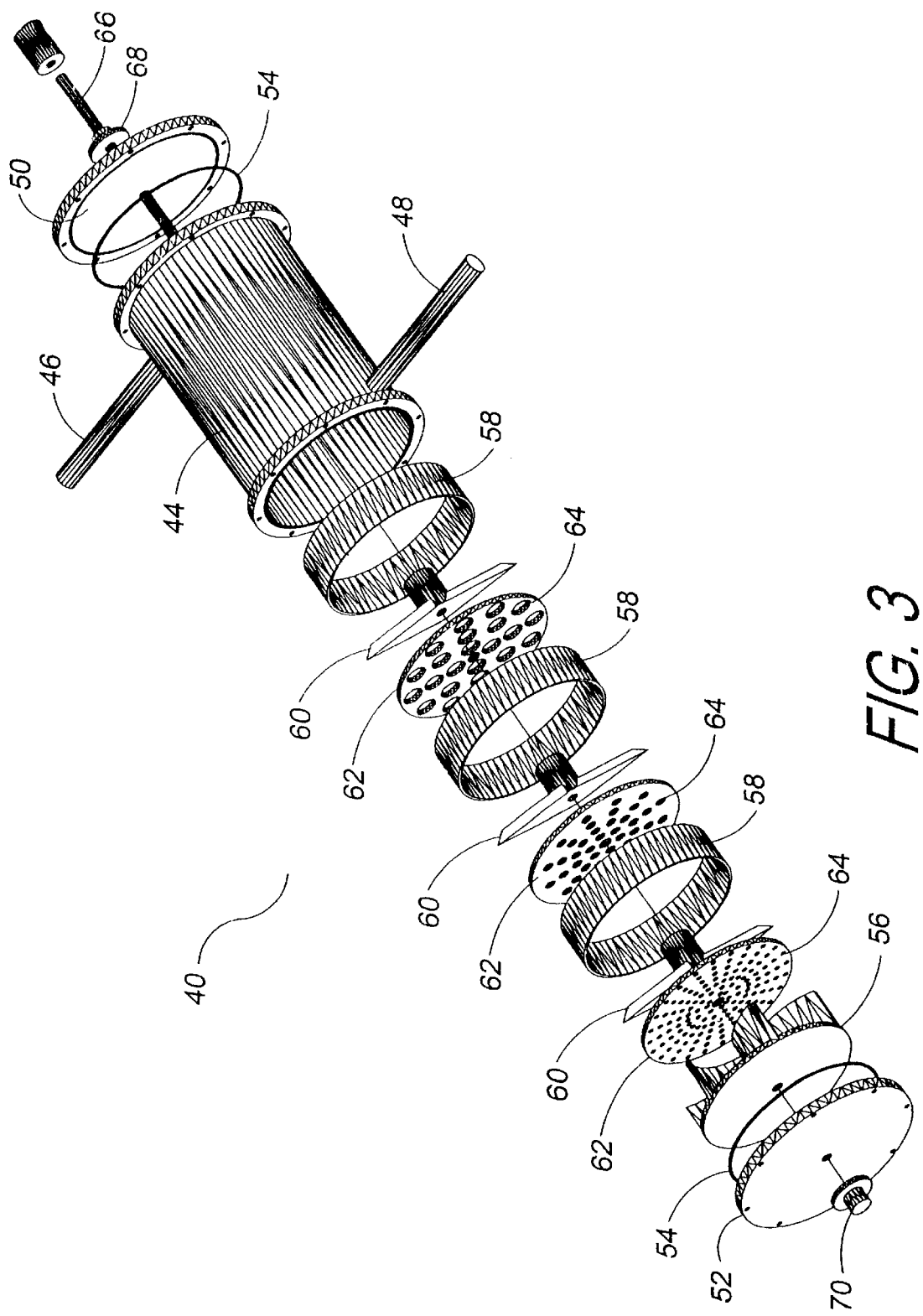
FIG. 3 is an exploded view of the reducer.
Figure 4:
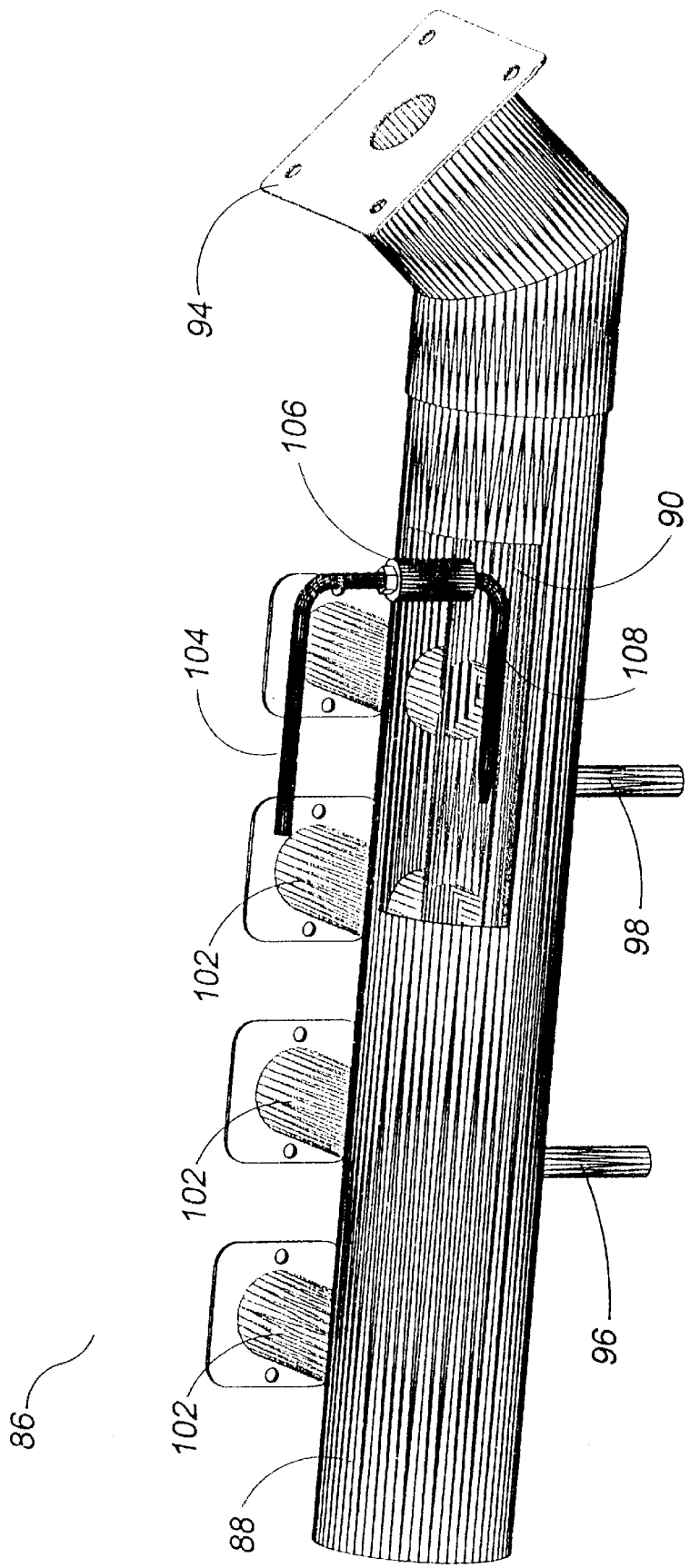
FIG. 4 is a perspective view, partially sectioned, of the exhaust system of the vessel having the waste treatment system of the present invention attached thereto.

A reducer 40 is in fluid flow communication with the discharge line 42 of the second macerator 34b. The reducer 40 reducing incoming waste to a size that is no larger than a predetermined size. As seen in FIGS. 2 and 3, the reducer 40 is comprised of a housing 44 having an inlet port 46, connected to the discharge line 42 of the second macerator 34b, and a discharge port 48. A first end plate 50 is placed on one end of the housing 44 while a second end plate 52 is placed on the opposing side of the housing 44. Appropriate O-rings 54 or other sealing means seal each end plate 50 and 52 to the housing 44. An impeller 56 is disposed within the housing 44 proximate the second plate 52. At least one reducing station is disposed within the housing 44. Each reducing station is comprised of a spacer 58, a cutter head 60 and a sizing plate 62. As seen, each sizing plate 62 has a plurality of uniform sized openings 64 therein, with the size of the openings 64 being reduced between successive reducing stations proceeding from the first end plate 50 to the second end plate 52. The size of the openings 64 of the final sizing plate 62 (the sizing plate 62 closest to the second end plate 52 is the maximum size of waste that will pass through to the discharge port 48. A shaft 66 passes through a first sealed bearing 68, the first end plate 50, each appropriate component—each cutter head 60, each sizing plate 62, the impeller 56—and the second end plate 52, with the end of the shaft 66 being received within a second sealed bearing 70. The opposing end of the shaft 70 is operatively connected to a motor 72 via an appropriate motor coupling 74. When the motor 72 is operational, the shaft 66 rotates which thereby rotates each cutter head 60, each sizing plate 62 and the impeller 56. In operation, waste enters the inlet port 46 and is passed into the first reducing station wherein the waste is acted upon by the first cutter head 60 in order to reduce the size of the solid particles of the waste. The cutter head 60 continues to act upon the waste until the particle of solid waste is sufficiently small enough to pass through an opening 64 on the sizing plate 62 associated with that particular cutter head 60. At such time, the particle of waste passes through the opening 64 of the sizing plate 62 and enters the next sizing station wherein the process begins anew. This process continues until the waste particle passes through the final sizing plate 62 downstream of the inlet port 46 and is discharged through the discharge port 48. The impeller 56 keeps the waste passing through the reducer 40.

A centrifugal separator 76 is fluid flow connected to the discharge port 48 of the reducer 40. A recirculation line 78 connects the centrifugal separator 76 to the holding tank 12. The centrifugal separator 76 is fluid flow connected to a first control valve 80. An injector pump 82 is fluid flow connected to the control valve 80, while a second valve 84 is fluid flow connected between the first control valve 80 and the injector pump 82. The second control valve 84 is connected to a source of potable water or other appropriate cleaning liquid. The injector pump 82 connects the waste treatment system 10 to the exhaust system 86 of the vessel.

As seen, the exhaust system 86 of the vessel is a standard exhaust system modified to receive the waste treatment system 10 of the present invention. The exhaust system 86 is comprised of an exhaust manifold having an outer shell 88 and an inner shell 90, the exhaust manifold being attached to an exhaust pipe 92 in appropriate fashion via the illustrated riser mount plate 94. The outer shell 88 has a cooling inlet port 96 and a cooling outlet port 98 for passing a cooling medium therethrough for cooling the exhaust manifold. The inner shell 90 is connected to the engine 100 via one or more exhaust port tubes 102 to receive the exhaust of the engine 100. The waste treatment system 10 introduces an injector tube 104 that passes through the outer shell 88 into the inner shell 90 via an appropriate adapter 106 such as the illustrated bushing. An injector nozzle 108 is connected to the injector tube 104, the injector nozzle 108 being aimed upstream of the exhaust.

Appropriate sensors 110, 112, and 114 are appropriately placed on the engine 100 and exhaust system of the vessel for measuring the RPM of the engine 100, the engine's cooling liquid temperature, and the exhaust gas temperature respectively.

A computer 116 is connected to all required components including the first multilevel sensor 28, the second multilevel sensor 30, the overflow valve 32, the macerator motor 36, the reducer motor 72, the first control valve 80, the second control valve 84, the injector pump 82, the engine RPM sensor 110, the cooling liquid temperature sensor 112, and the exhaust gas temperature sensor 114.

In operation, the waste treatment system 10 receives waste into the holding tank 12 from the various waste creating sources including the head 14, the galley 16, the shower 18 and from the bilge pump 20. If the first multilevel sensor 28 detects that the holding tank 12 is empty, the system 10 remains idle. Once waste is detected within the holding tank 12 by the first multilevel sensor 28, the macerator pumps 34a and 34b are activated. If the exhaust gas temperature is below a predetermined level, the exhaust is too cold to incinerate the waste and therefore no waste is injected into the exhaust manifold. Therefore, the first control valve 80 remains closed and the injector pump 82 is idle. In this condition, as long as there is waste in the holding tank 12, the macerators 34a and 34b, the reducer 40, and the centrifugal separator 76 remain operative and continuously condition the waste. The waste goes from the holding tank 12 through the first macerator 34a and second macerator 34b, the reducer 40, and the centrifugal separator 76 and is recirculated back to the holding tank 12 via the recirculation lines 38 and 78. This process can continue indefinitely. Once the exhaust gas temperature rises above the predetermined level, the exhaust gas is sufficiently hot to incinerate the incoming waste and therefore, the remainder of the system becomes operational. Accordingly, the waste leaves the second macerator pump 34b and enters the reducer 40 for the waste to be reduced to a certain maximum size. The waste leaves the reducer 40 and enters the centrifugal separator 76. The centrifugal separator 76 separates the waste such that relatively large pieces of waste are recirculated back to the holding tank 12 via the recirculation line 78, and the relatively small pieces of waste, as well as the liquid waste, is passed to the injector pump 82. The injector pump 82 pumps the waste to the exhaust system 86 of the vessel, and the waste is injected into the inner shell 90 via the injector nozzle 108. The injected wasted is incinerated and the resulting ash and vapor are discharged along with the exhaust gases of the engine 100. If at any time the exhaust temperature falls below the predetermined level, the first control valve 80 closes and the injector pump 82 goes idle. If waste is still present in the holding tank 12, the macerator pumps 34a and 34b, the reducer 40 and the centrifugal separator 76 remain operational. If at any time the holding tank 12, becomes empty, the entire system 10 becomes idle. If the holding tank 12 is full and the bilge tank 22 senses incoming fluid, via the second multilevel sensor 30, the system 10 assumes the vessel is taking on water. This causes the system 10 to open the overflow valve 32, and the bilge pump 20 pumps the contents within the bilge tank 22 overboard. Upon the system 10 needing to shutdown the injector pump 82, the second control valve 84 opens and introduces appropriate liquid into the injector pump 82 in order flush the injector pump 82 and injector nozzle 108 so that waste does not cake up and clog the system 10. All control of the system 10 is performed by the computer 116.

While the invention has been particularly shown and described with reference to an embodiment thereof, it will be appreciated by those skilled in the art that various changes in form and detail may be made without departing from the spirit and scope of the invention.

I claim:

1. A waste treatment system for use with a vehicle, the vehicle having an engine with an exhaust manifold, the waste treatment system comprising:

a holding tank for holding the waste;

a conduit line connected to an input source, selected from the group consisting of a head, a galley, a shower, and a bilge tank, and connected to the holding tank, for introducing waste into the holding tank from the input source;

an overflow line, connected to the input source, for discharging excess contents from the input source;

at least one macerator, fluid flow connected to the holding tank, for removing the waste from the holding tank and introducing the waste to the exhaust manifold;

an injector nozzle disposed within the exhaust manifold;

an injector pump, fluid flow disposed between the macerator and the injector nozzle, for pumping the waste from the at least one macerator to the injector nozzle;

a first sensor disposed within the holding tank;

a second sensor disposed within the bilge tank;

an overflow valve, fluid flow connected to the overflow line; and a control module connected to the first sensor, the second sensor, and the overflow valve for monitoring the parameters of the first sensor and the second sensor and controlling the overflow valve based on the parameters.

2. The waste treatment system as in claim 1 further comprising a reducer disposed between the at least one macerator and the injector pump for reducing the size of the waste.

3. The waste treatment system as in claim 2 wherein the reducer is comprised of:

a housing;

a motor;

an impeller, operatively connected to the motor, disposed within the housing;

at least one cutter head, operatively connected to the motor, disposed within the housing; and at least one sizing plate, each having a plurality of openings, operatively connected to the motor and associated with a respective one of the at least one cutter head.

4. The waste treatment system as in claim 2 further comprising a centrifugal separator disposed between the reducer and the injector pump.

5. The waste treatment system as in claim 4 further comprising a recirculation line connected between the reducer and the tank.

6. The waste treatment system as in claim 4 further comprising a fluid line, fluid flow connected to a source of fresh liquid, disposed between the centrifugal separator and the injector pump.

7. The waste treatment system as in claim 6 further comprising a control valve disposed within the fluid line.

8. The waste treatment system as in claim 1 further comprising:

a sensor disposed within the holding tank; and a control module connected to the macerator and the sensor for monitoring parameters of the engine and controlling the macerator based on the parameters.

9. The waste treatment system as in claim 1 further comprising:

a sensor disposed within the exhaust manifold; and a control module connected to the injector pump and the sensor for monitoring parameters of the sensor and controlling the injector pump based on the parameters.

10. A waste treatment system for use with a vehicle, the vehicle having an engine with an exhaust manifold, the waste treatment system comprising:

a holding tank for holding the waste;

at least one macerator, fluid flow connected to the holding tank, for removing the waste from the holding tank and introducing the waste to the exhaust manifold;

an injector nozzle disposed within the exhaust manifold;

an injector pump, fluid flow disposed between the macerator and the injector nozzle, for pumping the waste from the at least one macerator to the injector nozzle;

a reducer disposed between the at least one macerator and the injector pump for reducing the size of the waste;

a centrifugal separator disposed between the reducer and the injector pump; and a fluid line, fluid flow connected to a source of fresh liquid, disposed between the centrifugal separator and the injector pump.

11. The waste treatment system as in claim 10 further comprising a conduit line connected to an input source and connected to the holding tank, for introducing waste into the holding tank from the input source.

12. The waste treatment system as in claim 11 wherein the input source is selected from the group consisting of a head, a galley, a shower, and a bilge tank.

13. The waste treatment system as in claim 12 further comprising an overflow line, connected to the input source, for discharging excess contents from the input source.

14. The waste treatment system as in claim 13 further comprising:

a first sensor disposed within the holding tank;

a second sensor disposed within the bilge tank;

an overflow valve, fluid flow connected to the overflow line; and a control module connected to the first sensor, the second sensor, and the overflow valve for monitoring parameters of the first sensor and the second sensor and controlling the overflow valve based on the parameters.

15. The waste treatment system as in claim 10 wherein the reducer is comprised of:

a housing;

a motor;

an impeller, operatively connected to the motor, disposed within the housing;

at least one cutter head, operatively connected to the motor, disposed within the housing; and at least one sizing plate, each having a plurality of openings, operatively connected to the motor and associated with a respective one of the at least one cutter head.

16. The waste treatment system as in claim 10 further comprising a recirculation line connected between the reducer and the tank.

17. The waste treatment system as in claim 10 further comprising a control valve disposed within the fluid line.

18. The waste treatment system as in claim 10 further comprising a centrifugal separator disposed between the reducer and the at least one macerator.

19. The waste treatment system as in claim 10 further comprising:
    a sensor disposed within the holding tank; and
    a control module connected to the macerator and the sensor for monitoring parameters of the engine and controlling the macerator based on the parameters.

20. The waste treatment system as in claim 10 further comprising:
    a sensor disposed within the exhaust manifold; and
    a control module connected to the injector pump and the sensor for monitoring parameters of the sensor and controlling the injector pump based on the parameters.

21. A waste treatment system for use with a vehicle, the vehicle having an engine with an exhaust manifold, the waste treatment system comprising:
    a holding tank for holding the waste;
    at least one macerator, fluid flow connected to the holding tank, for removing the waste from the holding tank and introducing the waste to the exhaust manifold;
    an injector nozzle disposed within the exhaust manifold;
    an injector pump, fluid flow disposed between the macerator and the injector nozzle, for pumping the waste from the at least one macerator to the injector nozzle;
    a centrifugal separator disposed between the reducer and the at least one macerator; and
    a fluid line, fluid flow connected to a source of fresh liquid, disposed between the centrifugal separator and the injector pump.

22. The waste treatment system as in claim 21 further comprising a conduit line connected to an input source and connected to the holding tank, for introducing waste into the holding tank from the input source.

23. The waste treatment system as in claim 22 wherein the input source is selected from the group consisting of a head, a galley, a shower, and a bilge tank.

24. The waste treatment system as in claim 23 further comprising an overflow line, connected to the input source tank, for discharging excess contents from the input source.

25. The waste treatment system as in claim 24 further comprising:
    a first sensor disposed within the holding tank;
    a second sensor disposed within the bilge tank;
    an overflow valve, fluid flow connected to the overflow line; and
    a control module connected to the first sensor, the second sensor, and the overflow valve for monitoring parameters of the first sensor and the second sensor and controlling the overflow valve based on the parameters.

26. The waste treatment system as in claim 21 further comprising a reducer disposed between the at least one macerator and the injector pump for reducing the size of the waste.

27. The waste treatment system as in claim 26 wherein the reducer is comprised of:
    a housing;
    a motor;
    an impeller, operatively connected to the motor, disposed within the housing;
    at least one cutter head, operatively connected to the motor, disposed within the housing; and
    at least one sizing plate, each having a plurality of openings, operatively connected to the motor and associated with a respective one of the at least one cutter head.

28. The waste treatment system as in claim 26 further comprising a centrifugal separator disposed between the reducer and the injector pump.

29. The waste treatment system as in claim 28 further comprising a recirculation line connected between the reducer and the tank.

30. The waste treatment system as in claim 21 further comprising a control valve disposed within the fluid line.

31. The waste treatment system as in claim 21 further comprising:
    a sensor disposed within the holding tank; and
    a control module connected to the macerator and the sensor for monitoring parameters of the engine and controlling the macerator based on the parameters.

32. The waste treatment system as in claim 21 further comprising:
    a sensor disposed within the exhaust manifold; and
    a control module connected to the injector pump and the sensor for monitoring parameters of the sensor and controlling the injector pump based on the parameters.

* * * * *